C. ZIMMERMAN.
POWER TRANSMISSION FOR AUTOMOBILES.
APPLICATION FILED APR. 6, 1911.
1,033,511.
Patented July 23, 1912.
2 SHEETS—SHEET 2.
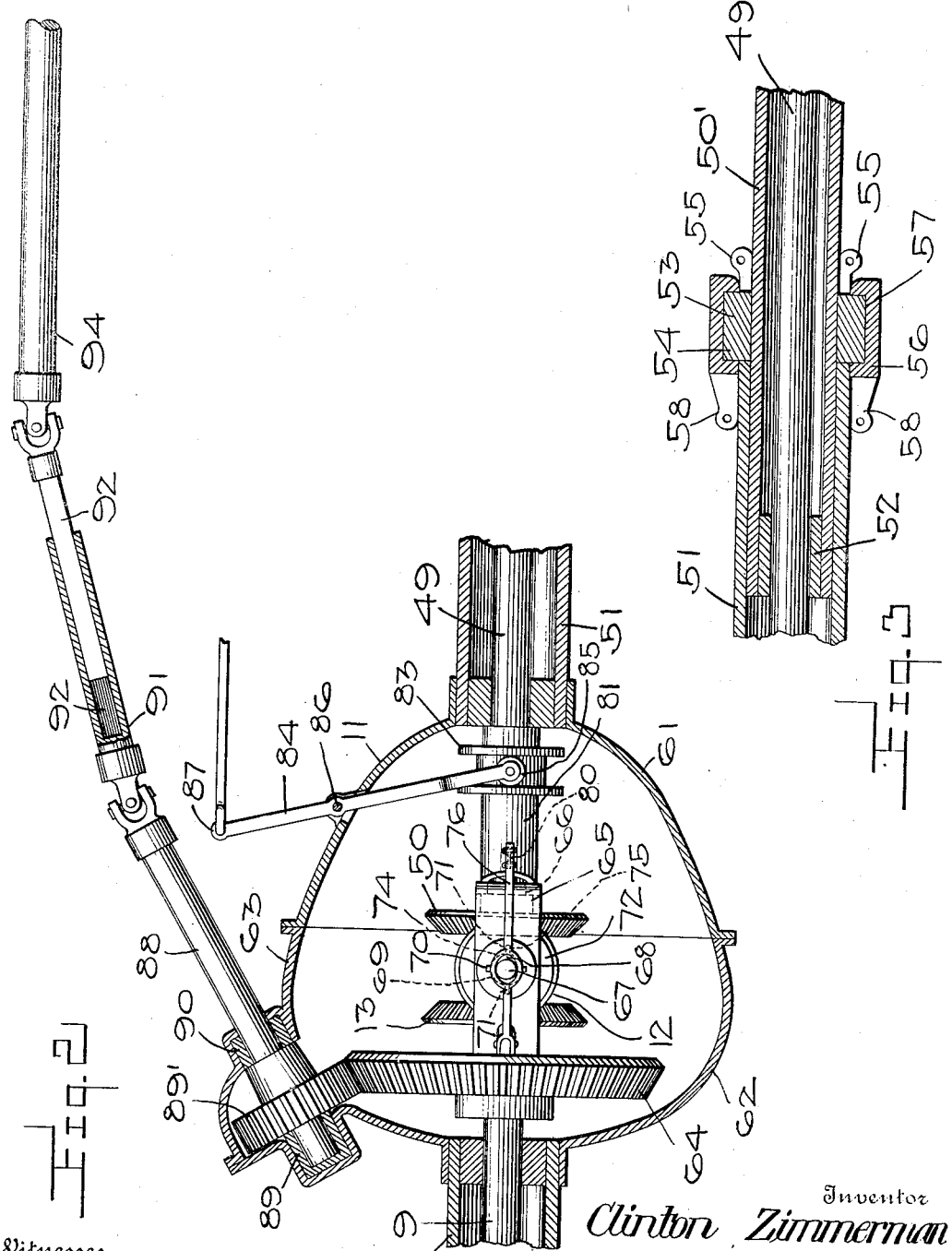
Witnesses
Ed. F. Lusby
W. H. Woodman
Inventor
Clinton Zimmerman
By
Attorneys

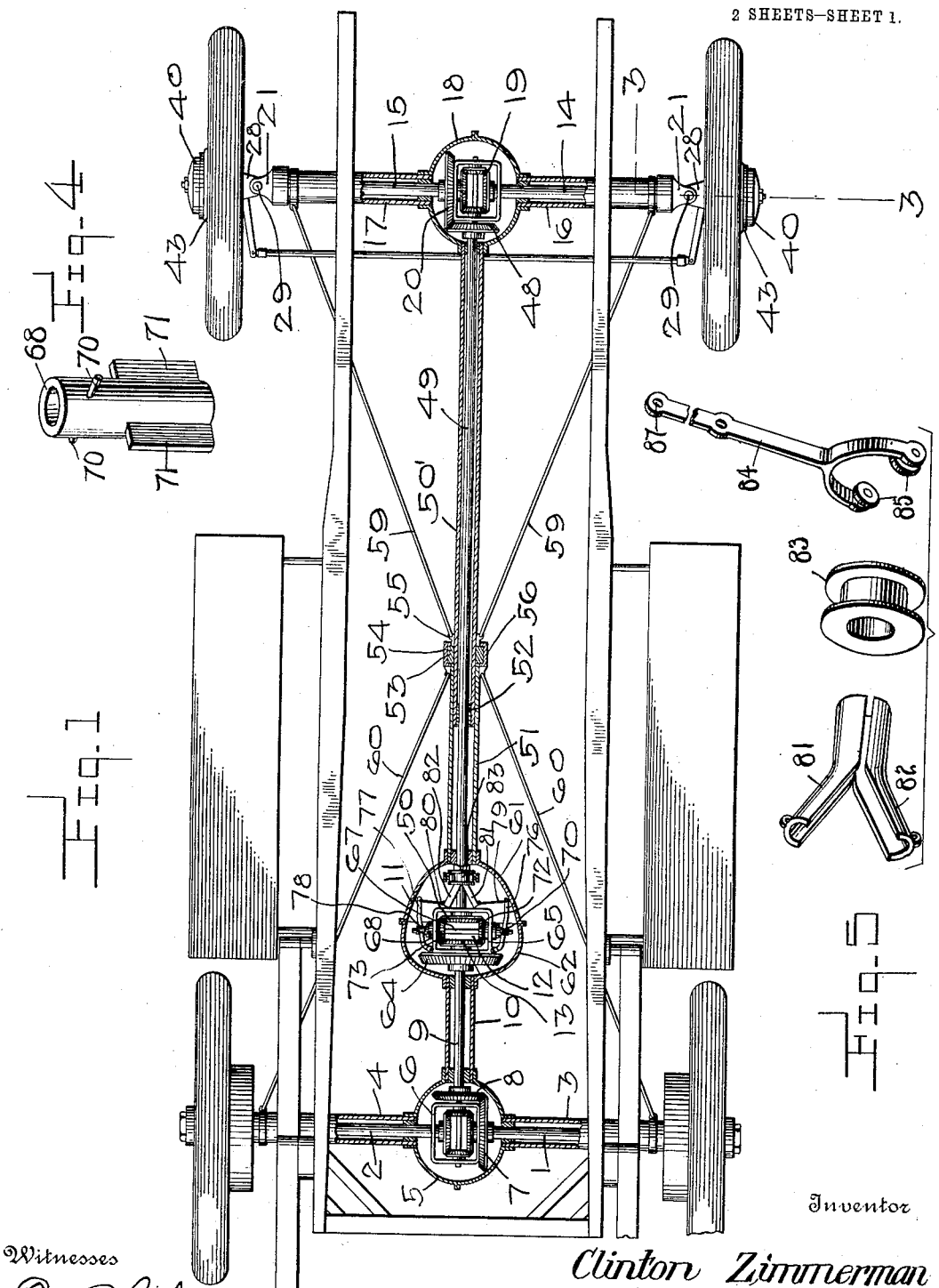

UNITED STATES PATENT OFFICE.

CLINTON ZIMMERMAN, OF WORTHINGTON, MINNESOTA, ASSIGNOR OF ONE-THIRD TO CHRIST ZIMMERMAN, OF WORTHINGTON, MINNESOTA.

POWER TRANSMISSION FOR AUTOMOBILES.

1,033,511.  Specification of Letters Patent.  Patented July 23, 1912.

Application filed April 6, 1911. Serial No. 619,391.

*To all whom it may concern:*

Be it known that I, CLINTON ZIMMERMAN, a citizen of the United States, residing at Worthington, in the county of Nobles, State of Minnesota, have invented certain new and useful Improvements in Power Transmissions for Automobiles; and I do hereby declare the following to be a full, clear, and exact description of the invention, such as will enable others skilled in the art to which it appertains to make and use the same.

My invention relates to new and useful improvements in motor driven vehicles and more especially to the means for driving the same, and the object of my invention is to provide means for driving both the front and rear wheels in a greatly improved manner.

Heretofore in four wheel drives one of the chief disadvantages has been in the turning of sharp corners, no provision having been made for allowing for the various rates of speed of the different wheels which is caused by the car swinging upon one of its rear wheels as a pivot. In doing this the remaining wheels each being at a different distance from the pivotal wheel must all revolve at different speeds or else a part of them will be dragged along with consequent damage to the tires.

In two wheel drives the differential provides for this and in four wheel drives differentials have been placed in both the front and rear axles to answer this purpose. This however has not been found to be wholly satisfactory as it does not provide for a difference in speed between the front and the rear wheels.

Another object of my invention is therefore to provide a differential between the front and rear drive shaft as well as in the forward and rear axles. By this means the difference in speed of all four wheels in rounding a corner is provided for. When thus constructed it follows that if either of the forward or either of the rearward wheels gets in mud or snow and slips the other wheels will be powerless as in the case when one wheel of a two wheel differential drive gets in the same position. And a still further object of my invention is therefore to provide a lock for my differential whereby either the front or rear wheels may be positively driven irrespective of the slipping of the others.

With these and other objects in view my invention consists primarily of a front axle and a rear axle, differential driving means for each of said axles, means including a differential for actuating said driving means and a lock for said latter differential.

In the accompanying drawings which illustrate a preferred embodiment of my device, Figure 1 is a sectional plan view of my improved driving mechanism as applied to the running gear of the car. Fig. 2 is a side elevation partially in section, of the means for locking the differential. Fig. 3 is a detail section of a portion of the forward drive shaft casing showing the swivel joint therein. Fig. 4 is a detail perspective of one of the locking collars used in the differential lock. Fig. 5 is a detail perspective of a portion of the lock actuating mechanism.

Referring more specifically to the drawings in which like reference numerals designate corresponding parts throughout, the rear axle is seen to be constructed in the customary manner with the axle shafts 1 and 2 journaled in the extensions 3 and 4 of the differential casing 5, the differential gear 6 as shown being of a well known form and therefore needing no description. This differential includes the bevel gear 7 which meshes with a bevel gear 8 keyed upon the rear end of the rear drive shaft 9.

The rear drive shaft 9 is journaled in and extends through the casing 10 which connects the differential casing 5 with the casing 11 of the main differential 12 together with its locking mechanism and a bevel gear 13 is keyed upon the inner end of this shaft.

The main portion of the front axle is similar in all respects to the rear axle and consists of the axle shafts 14 and 15 journaled in the extensions 16 and 17 of the differential casing 18 in which as shown is a differential gear 19 identical in construction to the differential gear 6 except that it is so placed that its bevel gear 20 faces in the opposite direction to the corresponding bevel gear 7 of the former. By thus reversing the position of this differential the forward axle shafts are driven in the same direction as the rear axle shafts.

In order to permit of the use of the front wheels for both driving and steering I have provided a peculiar form of hub and axle connection. The axle casings 16 and 17 terminate at their ends each in a yoke member 21 while the axle shafts 14 and 15 extend through said yokes and are each provided adjacent thereto with a hinged joint 22 of the customary or any preferred form, the free ends of the hinged members of the shafts being squared as at 23.

To return to the driving mechanism proper, the bevel gear 20 of the differential 19 meshes with a bevel gear 48 keyed upon the forward end of the forward drive shaft 49. This drive shaft 49 extends rearwardly and enters the differential casing 11 at a point opposite from the rear drive shaft 9 and keyed upon the rear end of this shaft 49 and directly opposite the bevel gear 13 is a bevel gear 50 identical in size to the gear 13. To protect this shaft 49 the differential casing 18 is provided with a rearward extension 50' while the differential casing 11 is provided with a forward extension 51 suitable in size to permit of the telescoping of the end of the extension 50' therein, both of said extension members being provided with suitable bearings 52 in which the shaft is journaled. A collar 53 is slidably and revolubly mounted upon the casing extension 50' and rests against the end of the casing extension 51, this collar being provided with the annular flange 54 and the perforated ears 55. A split collar 56 having an annular recess 57 adapted to engage the flange 54 of the collar 53 and the perforated ears 58 is slidably and revolubly mounted upon the casing extension 51. Brace rods 59 connect the ears 55 of the collar 53 with the ends of the forward axle casing, while similar brace rods 60 connect the ears 58 of the collar 56 with the ends of the rear axle casing. By this means the casings of the differentials 11 and 18 are connected together to wholly inclose the shaft, the collars with their brace rods furnishing a swivel supporting means for the shaft and its casing, and at the same time allowing independent motion between the front and rear axles.

Referring more specifically to the differential 12, its casing will be seen to consist of a forward member 61, a rear member 62 and an upper member 63 all secured together in the customary manner by bolts, rivets, or the like. Within this casing and revolubly mounted upon the shaft 9 is a bevel gear 64 which is the driven gear of the differential. This gear has secured thereto or formed integrally therewith the arched extension 65 provided with an aperture 66 through which the shaft 49 extends. A cross shaft 67 centrally located between the bevel gears 13 and 50 is supported in the side members of the arch in suitable bearings 68 which in turn are reciprocally mounted in the apertures 69 of said extension, said bearings each consisting of a slidable sleeve having the oppositely disposed studs 70 adjacent their outer end and the oppositely disposed lugs 71 extending at right angles to the studs, whereby the sleeves are held against rotation in the correspondingly shaped apertures 69.

Revolubly mounted upon the shaft 67 and held in position thereon by any preferred means, not shown, are the bevel pinions 72 and 73 each meshing with both of the bevel gears 13 and 50. To outer faces of both these pinions are provided with circular recesses 74 each recess being further cut away to form the recess 75 whereby the bearings 68 may be slipped inwardly upon the shaft 67 until their inner ends are seated in the outer portions of the pinions thereby locking the same from rotation.

Upon either side of the arched extension 65 and pivotally secured to the base thereof are the levers 76 and 77 which are bifurcated adjacent their central portions, said bifurcated portions passing one upon either side of the sleeves 68 and being provided with elongated slots 78 adapted to engage with the studs 70 thereof. The free ends of said levers are pivotally connected by the links 79 and 80 with the ends of double rocker cam members 81 and 82 respectively. These cam members are substantially bow-shaped and are adapted to bear against the shaft 49 one upon either side thereof, their inner faces being grooved for that purpose. Surrounding these cams is the double flanged collar 83 and it will readily be seen that by reciprocating this collar upon the cams they will be rocked and thus operate, through the toggle joints formed by the links and levers, to throw the sleeves 68 into and out of engagement with the pinions thus forming a locking means for the differential. As an operating means for this collar I provide the forked lever 84 adapted to straddle the same and provided with the rollers 85 for engaging the flanges of the collar. This lever is pivoted intermediate its ends as at 86 to the casing and its outer end is provided with an eye 87 whereby it may be operatively connected to a hand or foot lever placed within reach of the chauffeur.

It will be understood from the above that when in the unlocked position both the front and rear wheels will be driven by the differential and will thus possess all the advantages commonly derived from the use of a differential, and also that when locked both the forward and rear shaft will be driven as one, whereby the slipping of either set of wheels will not affect the operation of the other set.

In order to drive this mechanism I have provided a shaft 88 having one end suitably journaled in a bearing 89' carried by the casing member 62 and having a bevel gear 89 keyed thereto in mesh with the bevel gear 64 of the main differential 12. The other end of this shaft 88 extends out of the casing 63 through the additional bearing 90 and is connected by a gimbal joint with one end of a squared shaft member 91 which member is provided with a squared socket 92 in which is slidably mounted one end of a second squared member 93. The free end of the shaft member 93 is in turn connected by a gimbal joint to the free end of the shaft 94 which is the drive shaft of the transmission.

It will be seen from the above that I have provided a simple and novel means for driving all four wheels of a motor driven vehicle, at the same time by the use of an additional differential, making allowances for the differences in speed of the various wheels when turning a corner. And it will further be seen that I have provided an effectual locking means for my differential by which all wheels will be driven positively.

What I claim is:—

1. A four wheel drive for motor vehicles comprising a front and rear axle, differential driving means for each of said axles, means including a differential for actuating said driving means and a lock for said latter differential, said lock consisting of sleeves slidably mounted on the pinion shaft of the differential and provided with lugs adapted to engage with sockets formed in the pinions and means for actuating said sleeves.

2. The combination in a four wheel drive for motor vehicles with a rear axle and a front axle, drive shafts for said axles, a differential operatively connecting said axles, said differential consisting of a driven gear rotatably mounted upon one end of said drive shaft and provided with an arched frame through which the other shaft extends, a bevel gear keyed to the end of each drive shaft and within said frame, a pinion shaft rotatably mounted in said frame and pinions rotatable upon said pinion shaft and meshing with said bevel gears the outer faces of said pinions being recessed, of a lock for said differential, said lock consisting of sleeves slidable around said pinion shaft and through said frame, the inner ends of said sleeves being adapted to engage in the recesses of said pinions, and means for actuating said sleeves, said means consisting of levers pivoted by one end to said frame and operatively connected to said sleeves, links connecting the free ends of said levers to the ends of rocker cams and lever operated means for rocking said cams.

In testimony whereof, I affix my signature, in presence of two witnesses.

CLINTON ZIMMERMAN.

Witnesses:
J. H. CASHEL,
J. T. SMALLWOOD.